United States Patent
Wong et al.

(10) Patent No.: US 11,089,652 B2
(45) Date of Patent: Aug. 10, 2021

(54) INTER-AP COORDINATION AND SYNCHRONIZATION WITHIN WIRELESS COMMUNICATIONS

(71) Applicant: Avago Technologies International Sales Pte. Limited, Singapore (SG)

(72) Inventors: Chiu Ngok Eric Wong, San Jose, CA (US); Ron Porat, San Diego, CA (US); Nihar Jindal, Mountain View, CA (US); Matthew James Fischer, Mountain View, CA (US); Vinko Erceg, Cardiff by the Sea, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 8 days.

(21) Appl. No.: 15/962,815

(22) Filed: Apr. 25, 2018

(65) Prior Publication Data

US 2018/0242394 A1    Aug. 23, 2018

Related U.S. Application Data

(63) Continuation of application No. 14/296,733, filed on Jun. 5, 2014, now abandoned.
(Continued)

(51) Int. Cl.
*H04W 88/06* (2009.01)
*H04W 84/12* (2009.01)
(Continued)

(52) U.S. Cl.
CPC ............. *H04W 88/06* (2013.01); *H04L 1/00* (2013.01); *H04L 1/0003* (2013.01);
(Continued)

(58) Field of Classification Search
CPC .......... H04L 1/00; H04L 47/12; H04L 1/0003; H04L 1/0009; H04W 88/06; H04W 72/12; H04W 84/12
See application file for complete search history.

(56) References Cited

U.S. PATENT DOCUMENTS

2003/0048799 A1    3/2003  Jang
2006/0217067 A1*   9/2006  Helbig ................. H04W 16/14
                                                455/63.1
(Continued)

OTHER PUBLICATIONS

Non-Final Office Action on U.S. Appl. No. 14/296,733 dated Feb. 26, 2016.
(Continued)

*Primary Examiner* — Zhensheng Zhang
(74) *Attorney, Agent, or Firm* — Foley & Lardner LLP

(57) ABSTRACT

Coordination and synchronization is performed between two or more wireless network managers (e.g., access points (APs)). A first wireless network manager supports first communications with first other wireless communication devices, and a second wireless network manager supports second communications with those first and/or second other wirelessly case devices. The first and second wireless network managers also support communications with one another to coordinate the first and second communications supported with the first and/or second other wireless communication devices. Examples of coordination include selection of which other wireless communication devices are serviced or in communication with which of the first and second wireless network managers, selection of operational parameters (e.g., modulation coding set (MCS), beamforming, frequency band assignment, channel assignment, scheduling information, transmit power, etc.) for the first and
(Continued)

second wireless communication devices, synchronization to a common clock (e.g., using timing synchronization function (TSF)).

15 Claims, 8 Drawing Sheets

Related U.S. Application Data

(60) Provisional application No. 61/832,541, filed on Jun. 7, 2013, provisional application No. 61/832,515, filed on Jun. 7, 2013, provisional application No. 61/833,019, filed on Jun. 10, 2013, provisional application No. 61/864,855, filed on Aug. 12, 2013.

(51) Int. Cl.
*H04W 72/12* (2009.01)
*H04L 1/00* (2006.01)

(52) U.S. Cl.
CPC .......... *H04L 1/0009* (2013.01); *H04W 72/12* (2013.01); *H04W 84/12* (2013.01)

(56) References Cited

U.S. PATENT DOCUMENTS

| | | | |
|---|---|---|---|
| 2008/0002566 A1 | 1/2008 | Zhang et al. | |
| 2008/0080629 A1* | 4/2008 | Munzner | H04L 5/023 375/260 |
| 2010/0203828 A1 | 8/2010 | Zheng | |
| 2010/0322171 A1* | 12/2010 | Dekorsy | H04B 7/0621 370/329 |
| 2011/0105051 A1* | 5/2011 | Thomas | H04B 7/0617 455/69 |
| 2011/0116516 A1 | 5/2011 | Hwang et al. | |
| 2012/0026956 A1* | 2/2012 | Benjebbour | H04W 16/12 370/329 |
| 2014/0241276 A1 | 8/2014 | Berberana | |
| 2014/0307821 A1* | 10/2014 | Zhang | H04L 25/03904 375/267 |

OTHER PUBLICATIONS

Non-Final Office Action on U.S. Appl. No. 14/736,479 dated Jul. 6, 2017.
Notice of Allowance on U.S. Appl. No. 14/736,479 dated Jan. 25, 2018.

* cited by examiner

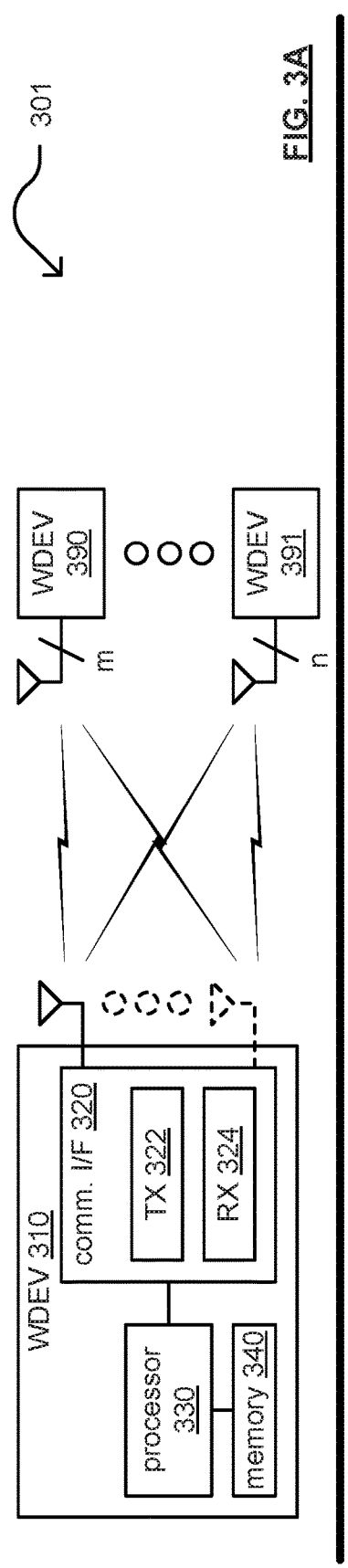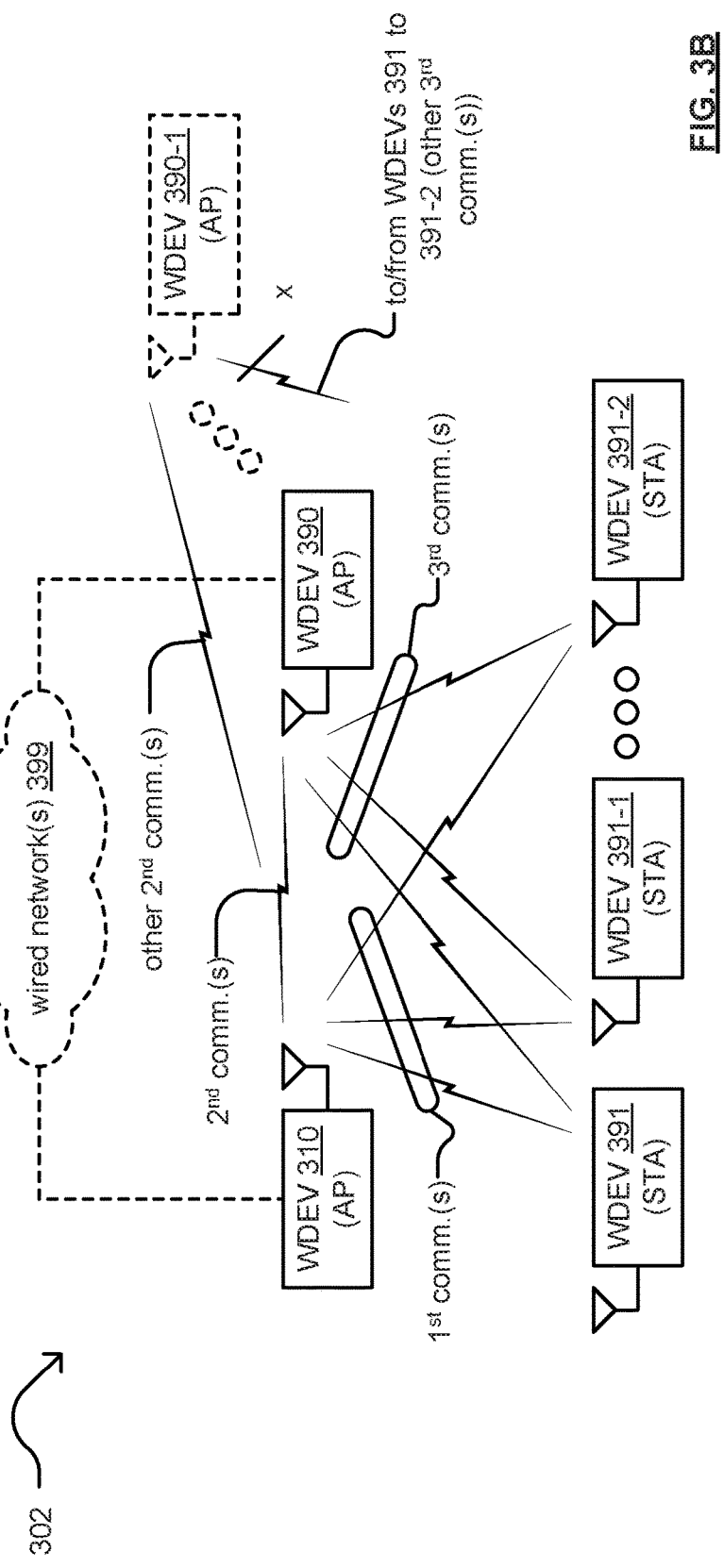

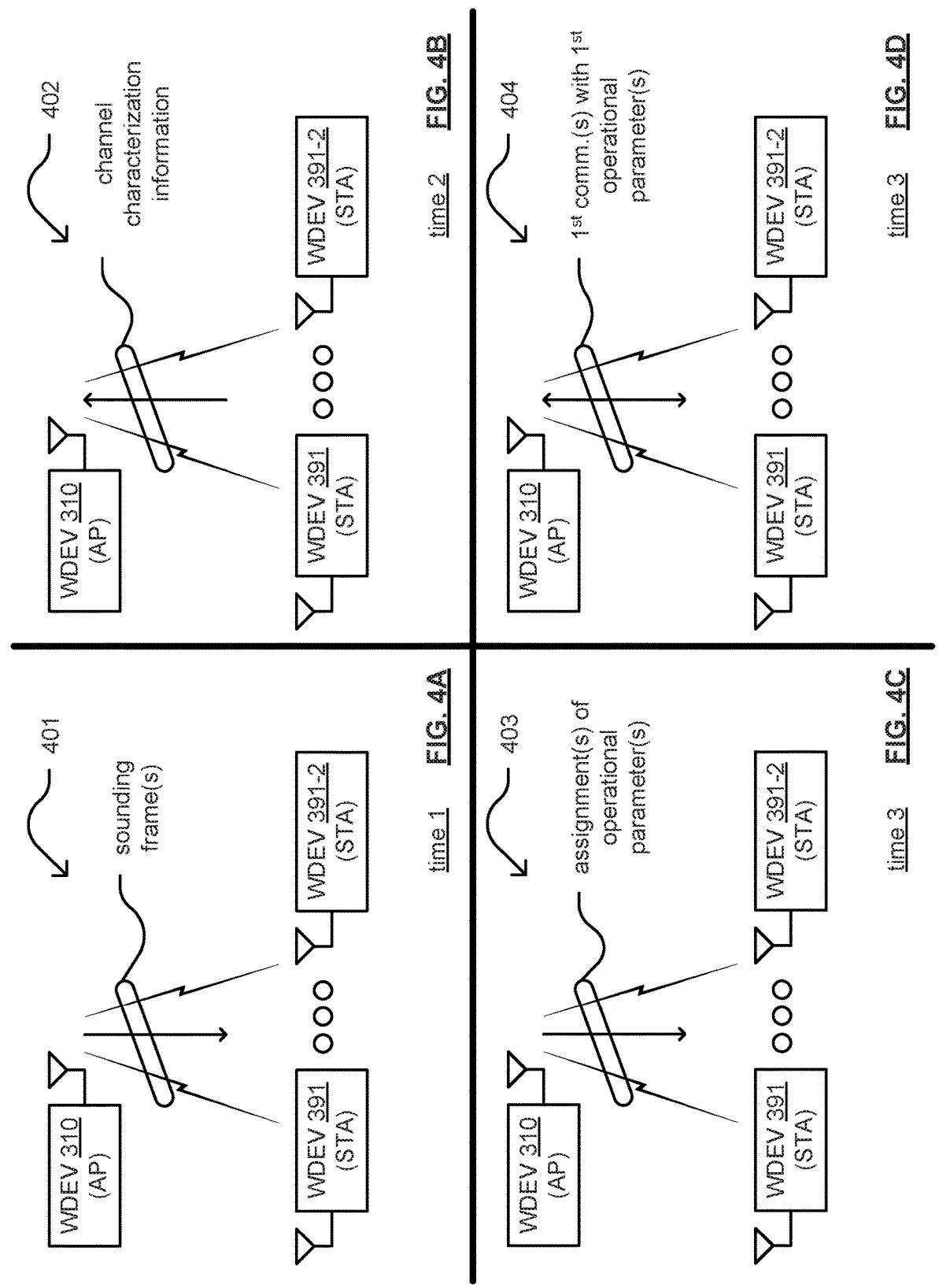

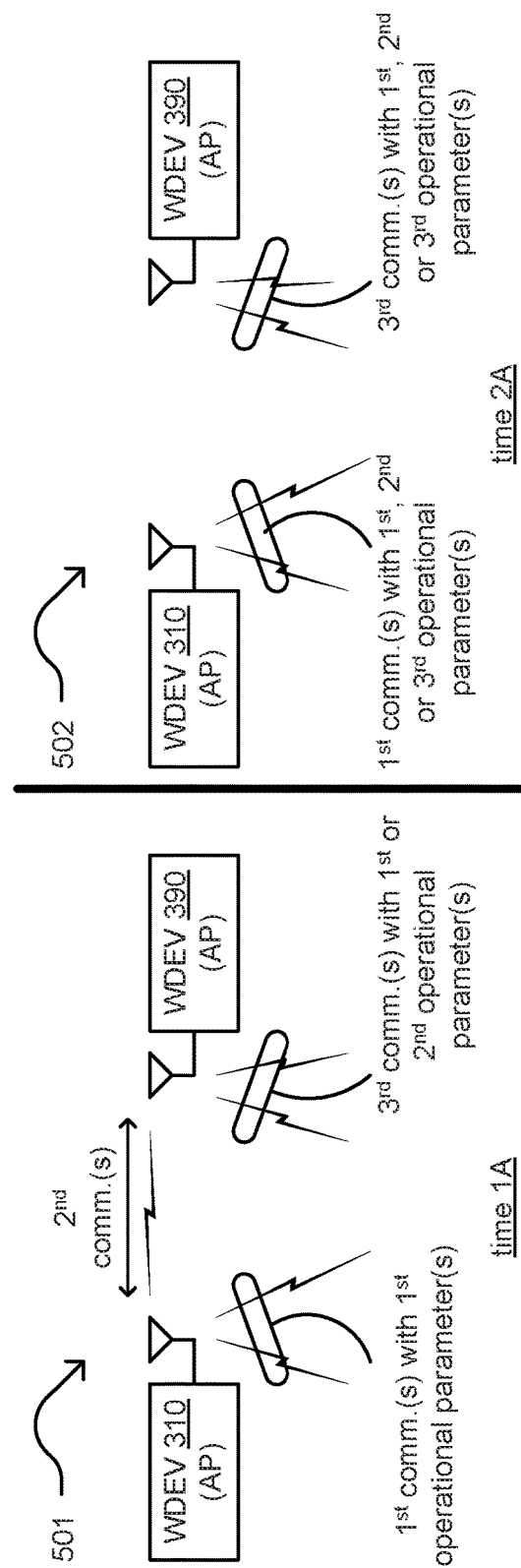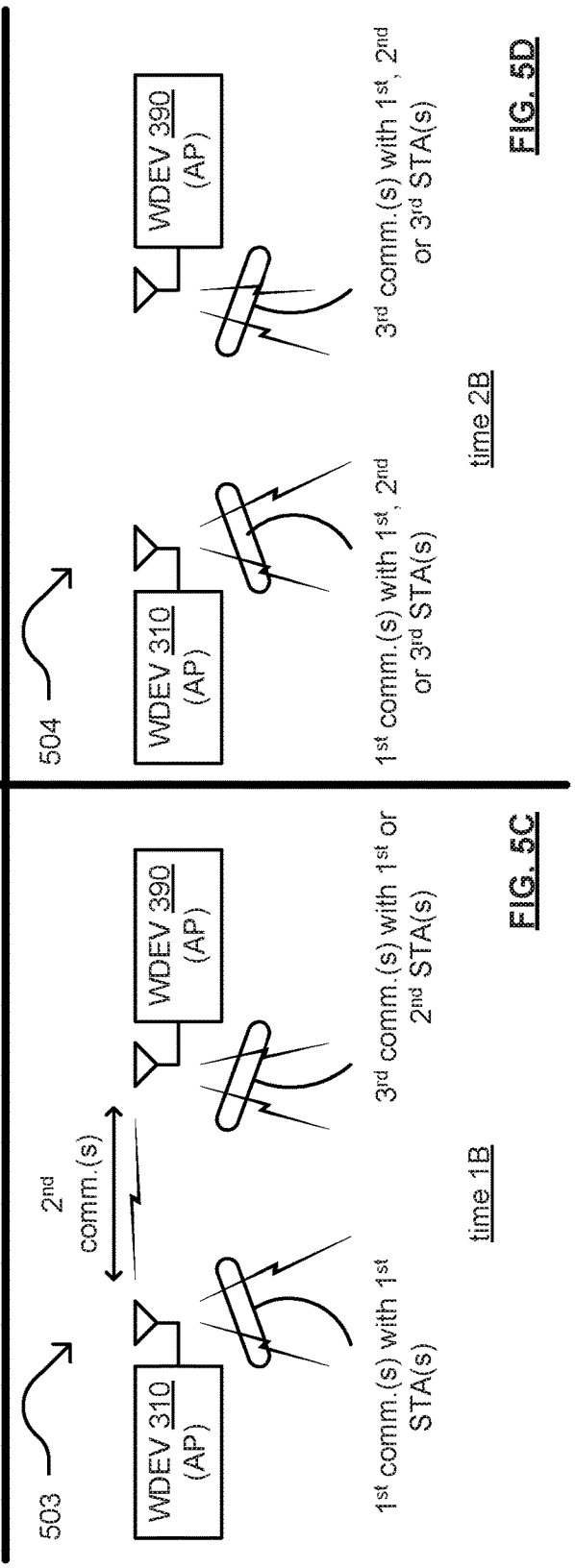

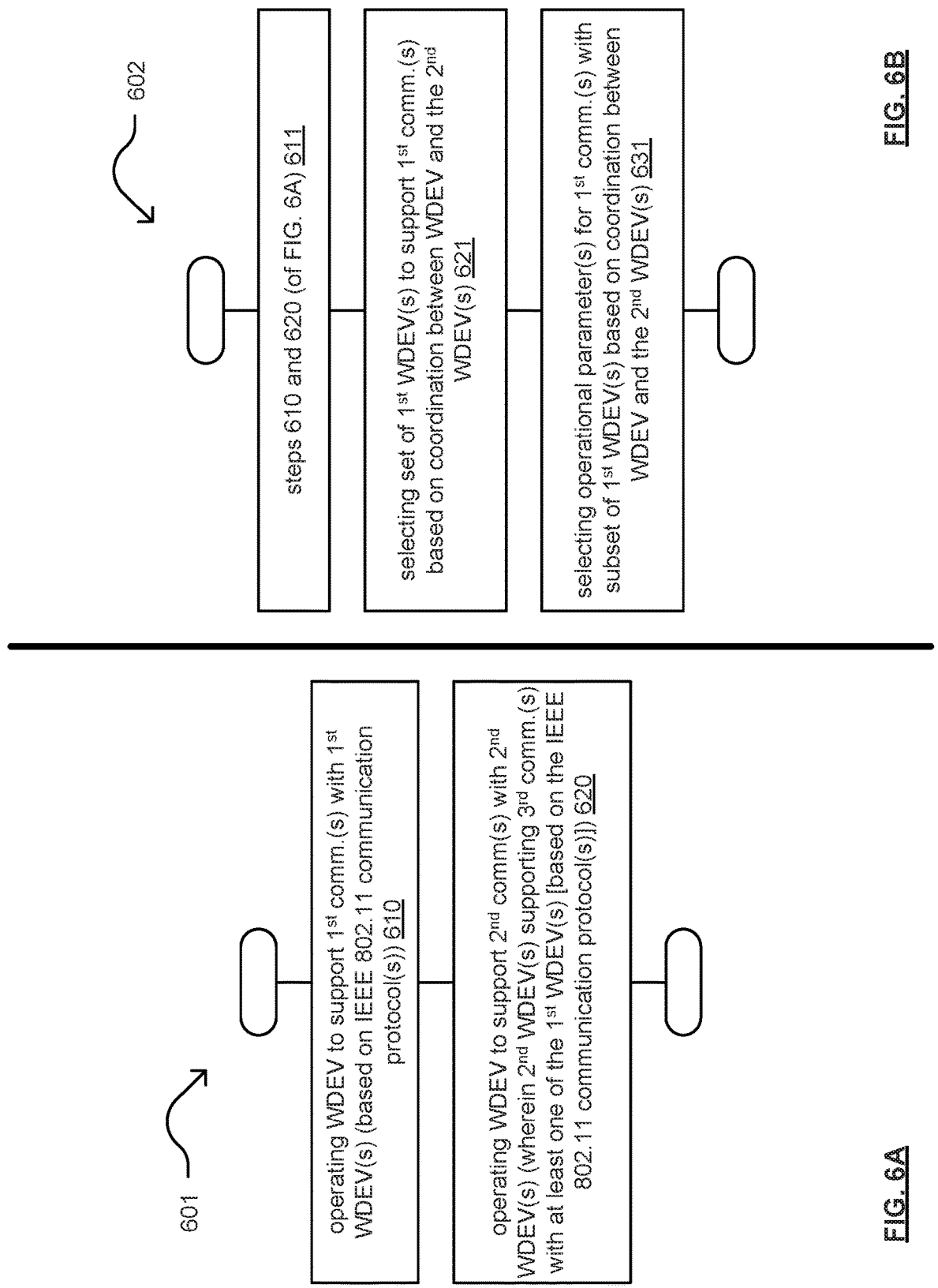

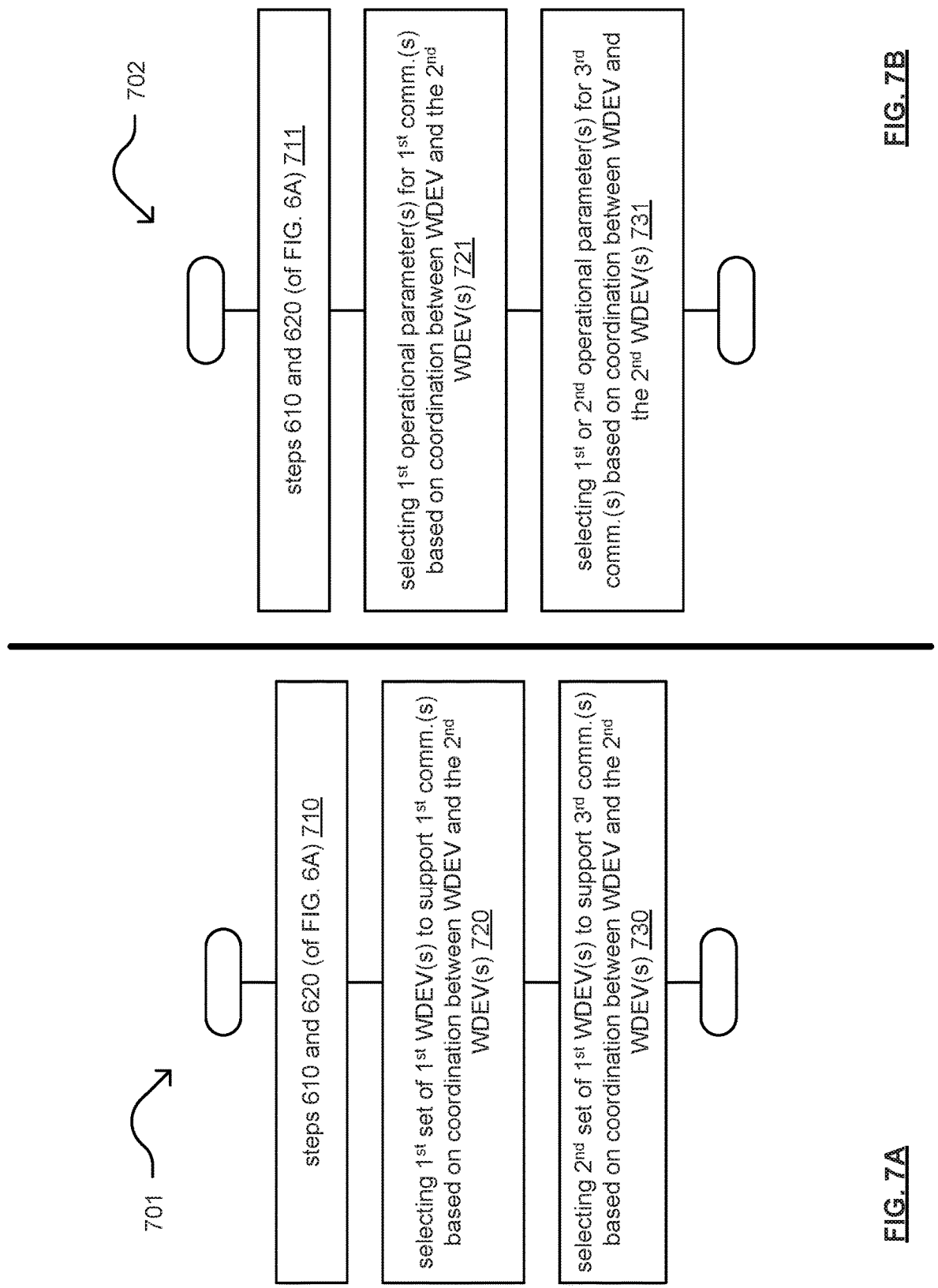

INTER-AP COORDINATION AND SYNCHRONIZATION WITHIN WIRELESS COMMUNICATIONS

CROSS REFERENCE TO RELATED PATENTS/PATENT APPLICATIONS

The present U.S. Utility Patent Application claims priority pursuant to 35 U.S.C. § 120 as a continuation of U.S. Utility application Ser. No. 14/296,733, entitled "Inter-AP coordination and synchronization within wireless communications", filed Jun. 5, 2014, which claims priority pursuant to 35 U.S.C. § 119(e) to U.S. Provisional Application No. 61/832,515, entitled "Coordinated beamforming and nulling within single user, multiple user, multiple access, and/or MIMO wireless communications," filed Jun. 7, 2013; U.S. Provisional Application No. 61/832,541, entitled "Inter-AP coordination and synchronization within single user, multiple user, multiple access, and/or MIMO wireless communications," filed Jun. 7, 2013; U.S. Provisional Application No. 61/833,019, entitled "Orthogonal frequency division multiple access (OFDMA) structures for high efficiency wireless communications," filed Jun. 10, 2013; and U.S. Provisional Application No. 61/864,855, entitled "Orthogonal frequency division multiple access (OFDMA) structures for high efficiency wireless communications," filed Aug. 12, 2013, all of which are hereby incorporated herein by reference in their entirety and made part of the present U.S. Utility Patent Application for all purposes.

BACKGROUND

Technical Field

The present disclosure relates generally to communication systems; and, more particularly, to multiple network manager coordination within single user, multiple user, multiple access, and/or MIMO wireless communications.

Description Of Related Art

Communication systems support wireless and wire lined communications between wireless and/or wire lined communication devices. The systems can range from national and/or international cellular telephone systems, to the Internet, to point-to-point in-home wireless networks and can operate in accordance with at least one communication standard. For example, wireless communication systems may operate in accordance with at least one communication standard including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Much additional effort continues to be directed to make improvements for communications within wireless local area networks (WLANs). Nonetheless, there continue to be deficiencies in many areas including the ever-increasing number of wireless communication devices that operate within common vicinity. The prior art doesn't provide adequate solutions to maximize wireless communication device and wireless communication performance in these and other situations.

BRIEF DESCRIPTION OF THE SEVERAL VIEWS OF THE DRAWINGS

FIG. 3A is a diagram illustrating an example of communication between wireless communication devices.

FIG. 3B is a diagram illustrating another example of communication between wireless communication devices.

FIG. 4A is a diagram illustrating another example of communication between wireless communication devices.

FIG. 4B is a diagram illustrating another example of communication between wireless communication devices for consideration with FIG. 4A.

FIG. 4C is a diagram illustrating another example of communication between wireless communication devices for consideration with FIG. 4A and FIG. 4B.

FIG. 4D is a diagram illustrating another example of communication between wireless communication devices for consideration with FIG. 4A, FIG. 4B, and FIG. 4C.

FIG. 5A is a diagram illustrating another example of communication between wireless communication devices.

FIG. 5B is a diagram illustrating another example of communication between wireless communication devices for consideration with FIG. 5A.

FIG. 5C is a diagram illustrating another example of communication between wireless communication devices.

FIG. 5D is a diagram illustrating another example of communication between wireless communication devices for consideration with FIG. 5C.

FIG. 6A is a diagram illustrating an embodiment of a method for execution by at least one wireless communication device.

FIG. 6B is a diagram illustrating another embodiment of a method for execution by at least one wireless communication device.

FIG. 7A is a diagram illustrating another embodiment of a method for execution by at least one wireless communication device.

FIG. 7B is a diagram illustrating another embodiment of a method for execution by at least one wireless communication device.

DETAILED DESCRIPTION

Figure 1:
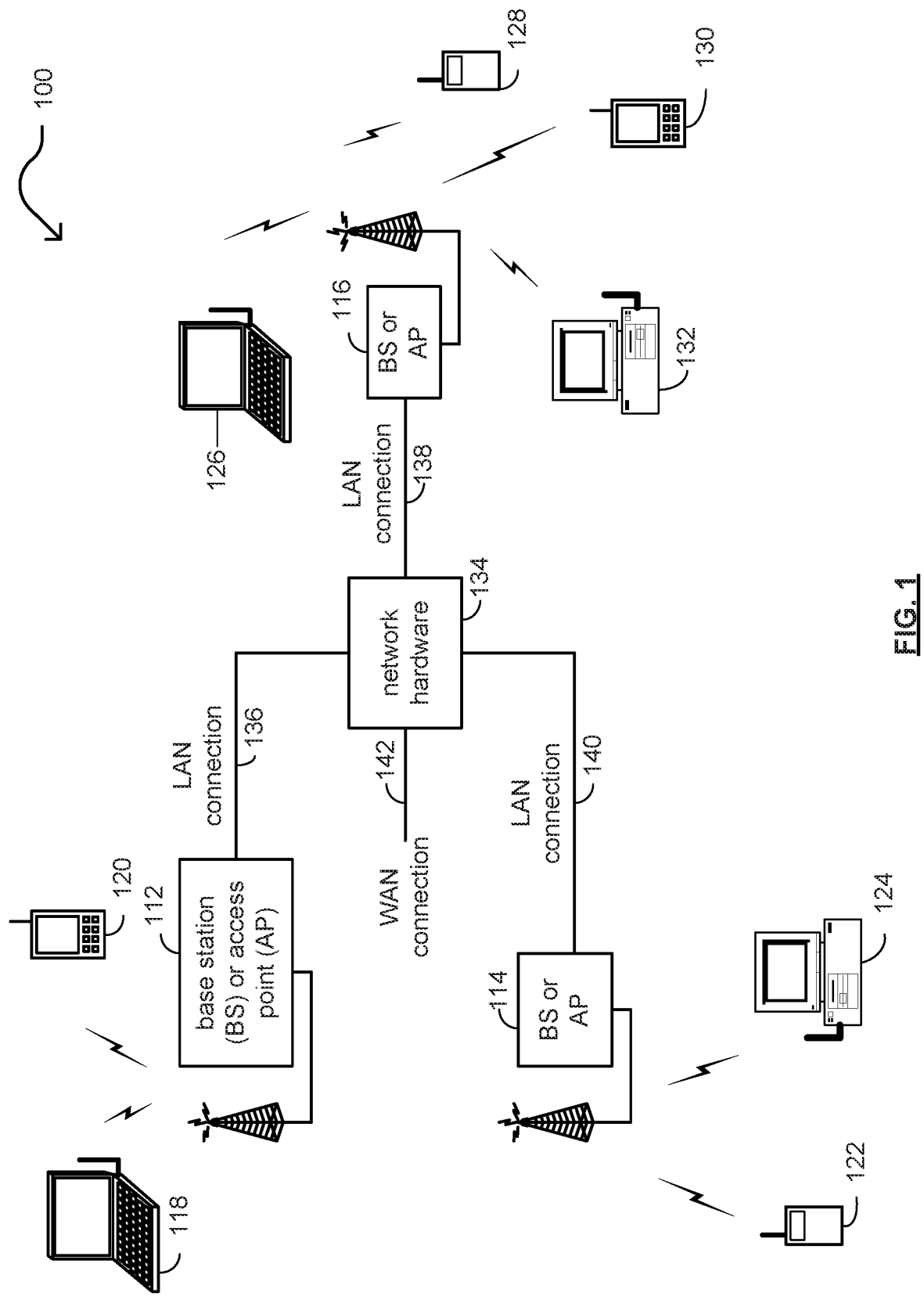
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116. In an example of operation, a processor implemented within one of the devices (e.g., any one of the WDEVs 118-132 and BSs or APs 112-116) is configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210," or devices 210-234 when referring to wireless communication devices 210-234; or with respect to FIG. 3 below, use of "device 310" may alternatively be used when referring to wireless communication device 310, or "devices 390 and 391 (or 390-391)" when referring to wireless communication devices 390 and 391 or WDEVs 390 and 391).

The processor of any one of the various devices, WDEVs 118-132 and BSs or APs 112-116, may be configured to support communications via at least one communication interface with any other of the various devices, WDEVs 118-132 and BSs or APs 112-116.

In an example of operation, a processor of one of the wireless communication devices is configured to support first communications, via the communication interface, with first at least one other wireless communication device based on at least one IEEE 802.11 communication protocol. The processor is also configured to support second communications, via the communication interface, with second at least one other wireless communication device that are configured to support third communications based on the at least one IEEE 802.11 communication protocol with at least one of the first at least one other wireless communication device. The second communications include messages for coordinating the first and third communications. Two different BSs or APs 112-116 may be configured to support communications with one another to coordinate the communications supported by each one of the BSs or APs 112-116 with at least one wireless station (STA). For example, a first AP may be configured to support first communications with first at least one STA, and a second AP may be configured to support second communications with second at least one STA.

The first and second APs are also configured to support communications with one another to coordinate the respective first and second communications. The first and second APs may communicate with one another wirelessly and or via at least one non-wireless link (e.g., a wired communication pathway via at least one wired communication network, and optical communication pathway via at least one optical communication network, etc.). One or both of the first and second APs may select which particular STAs are in communication with and serviced by each of the first and second APs. In addition, one or both of the first and second APs may select at least one operational parameter by which the first and second communications are performed. Examples of operational parameters may include frequency band assignment (e.g., 5 GHz frequency band, 2.4 GHz frequency band, etc.), channel assignment (e.g., primary, secondary, or other channel and/or including bandwidth of such channels such as 20 MHz, 40 MHz, 80 MHz, etc. channels), scheduling information for coordinating various communications, at least one token for channel access for at least one of the wireless communication device, transmit power for use by for at least one of the wireless communication device, basic services set (BSS) listing of first and second subsets of wireless communication devices associated with the first and second APs, BSS listing of at least one of the wireless communication devices associated with both of the first and second APs, channel statistics of at least one wireless communication channel between the wireless communication devices, timing synchronization function (TSF) information for at least one of the first at least one other wireless communication device, and/or any other operational parameters.

Figure 2:
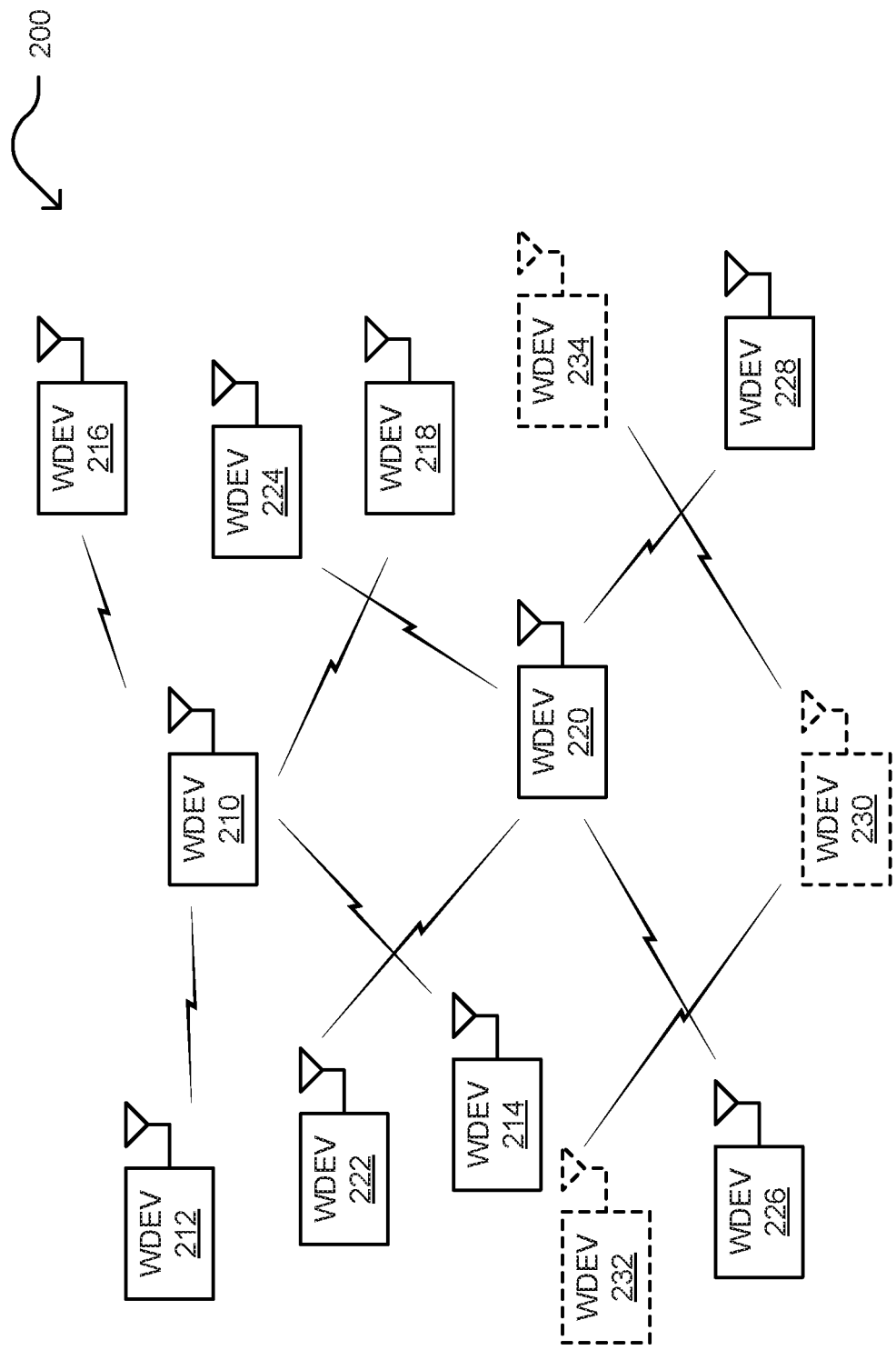
FIG. 2 is a diagram illustrating an embodiment of dense deployment of wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of wireless communication devices such as wireless communication devices 118-132, and the APs or AP-operative STAs may be any type of wireless communication devices such as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and AP are packed in a given area (e.g., which may be a relatively confined or concentrated area [indoor or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

As the number of devices operating within common vicinity continues to increase, two or more APs and/or AP-operative STAs may be configured to support communications between one another to coordinate the communications with at least one group of STAs. In an example of operation, device 210 is implemented as a first AP, and device 220 is implemented as a second AP. Devices 210 and 220 are configured to support communications with one another to coordinate first communications between device 210 and devices 212, 214, 216, and 218 as well as second communications between device 220 and devices 222, 224, 226, and 228. This example shows two separate groups of devices that are each respectively associated with a different AP. Based upon coordination between devices 210 and 220, at least one of the devices 212, 214, 216, and 218 may be switched to be serviced by and in communication with device 220 instead of device 210. Similarly, based upon coordination between devices 210 and 220, at least one of the devices 222, 224, 226, and 228 may be switched to be serviced by and in communication with device 210 instead of device 220. Also, based upon coordination between devices 210 and 220, at least one operational parameter for use by the devices 212, 214, 216, and 218 and 222, 224, 226, and 228 may be selected, modified, adapted, etc.

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of at least one frame (e.g., using a transmitter 322 and a receiver 324). The wireless communication device 310 also includes a processor 330, and an associated memory 340, to execute various operations including interpreting at least one frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and 391 may each include more than one antenna for transmitting and receiving of at least one frame (e.g., WDEV 390 may include m antennae, and WDEV 391 may include n antennae).

FIG. 3B is a diagram illustrating another example 302 of communication between wireless communication devices. Each of devices 310, 390 through 390-1, and 391, 391-1 through 391-2 include similar comments as shown and described with respect to device 310 above with respect to FIG. 3A. In this example, devices 310, 390 through 390-1 are configured to operate as access points (APs). Devices 391, 391-1 through 391-2 are configured to operate as wireless stations (STAs) that associate with, are serviced by, and in communication with at least one of the devices 310, 390 through 390-1 (APs). The devices 310, 390 through 390-1 (APs) are configured to support communications with one another via various means (e.g., wirelessly, via at least one wired communication link, via at least one optical communication link, etc.).

In an example of operation, a processor within device 310 is configured to support first communications, via a communication interface of device 310 and, with first at least one other wireless communication device 391, 391-1 through 391-2 based on at least one IEEE 802.11 communication protocol. The processor within device 310 is also configured to support second communications, via the communication interface, with second at least one other wireless communication device 390 through 390-1. At least one of the second at least one other wireless communication device 390 through 390-1 is configured to support third communications based on the at least one IEEE 802.11 communication protocol with at least one of the first at least one other wireless communication device 391, 391-1 through 391-2. The second communications between device 310 and the second at least one other wireless communication device 390 through 390-1 include messages for coordinating the first and third communications.

That is to say, each of the AP operative wireless communication devices 310, 390 through 390-1 is configured to communicate with one another to select at least one operational consideration. For example, selection may be made regarding which of the first at least one other wireless communication device 391, 391-1 through 391-2 is to be associated with which AP, which at least one operational parameter is to be used by each, all, or certain subsets of the first at least one other wireless communication device 391, 391-1 through 391-2, etc. Also, the grouping of which of the first at least one other wireless communication device 391, 391-1 through 391-2 are associated with which specific AP may be modified, changed, adapted over time. Analogously, any of the operational parameters used by any of the first at least one other wireless communication device 391, 391-1 through 391-2 may be modified, changed, adapted over time.

FIG. 4A is a diagram illustrating another example 401 of communication between wireless communication devices. At or during a first time (time 1), device 310, which is configured to operate as an AP, transmits at least one sounding frame to devices 391 through 391-2, which are each configured to operate as a respective STA. The same sounding frame may be transmitted to each of the devices 391 through 391-2.

FIG. 4B is a diagram illustrating another example 402 of communication between wireless communication devices for consideration with FIG. 4A. At or during a second time (time 2), each of the devices 391 through 391-2 respectively process at least one sounding frame received from the device 310 to make at least one characterization of the respective communication pathway between itself and device 310. Examples of such characterization may include channel estimate, calculation of at least one antenna configuration parameters including beamforming vectors, interference level, signal to noise ratio (SNR), noise, and/or any other information used to characterize or based on the characterization of channel. Device 310 then receives channel characterization information from at least one of the devices 391 through 391-2. In some instances, channel characterization information received from only one of the devices 391 through 391-2 is adequate, while channel characterization information may be needed from each one of the of the devices 391 through 391-2 in other situations.

FIG. 4C is a diagram illustrating another example 403 of communication between wireless communication devices for consideration with FIG. 4A and FIG. 4B. At or during a third time (time 3), device 310 determines at least one assignment of at least one operational parameter for use by the devices 391 through 391-2 and transmits at least one signal to the devices 391 through 391-2 to indicate the at least one assignment.

FIG. 4D is a diagram illustrating another example 404 of communication between wireless communication devices for consideration with FIG. 4A, FIG. 4B, and FIG. 4C. At or during a fourth time (time 4), device 310, device 310 supports first communications with the devices 391 through 391-2 based on the at least one operational parameter.

FIG. 5A is a diagram illustrating another example 501 of communication between wireless communication devices. At or during a first time (time 1A), device 310, which is configured to operate as an AP, supports second communications with device 390, which is also configured to operate as an AP. Each of the devices 310 and 390 support respective communications with at least one other device using operational parameters that are selected based on the second communications between devices 310 and 390. For example, device 310 supports first communications with first at least one other device using first at least one operational parameter, and device 390 supports third communications with the first at least one other device or second at least one other device using second at least one operational parameter. In one implementation, only one of the devices 310 or 390 selects the first and second at least one operational parameters. In another implementation, the devices 310 and 390 operate cooperatively to select the first and second at least one operational parameters. And in even another implementation, device 310 selects the first at least one operational parameter, and device 390 selects the second at least one operational parameter, and the selection made by both devices 310 and 390 is based, at least in part, on information included within and provided via the second communications between devices 310 and 390.

FIG. 5B is a diagram illustrating another example 502 of communication between wireless communication devices for consideration with FIG. 5A. At or during a second time (time 2A), device 310 supports first communications with the first at least one other device using the first, second, or third operational parameters, and device 390 supports third communications with the second at least one other device using the first, second, or third operational parameters. After devices 310 and 390 have supported communications with one another, adaptation or modification may be made of the operational parameters used by each of device 310 for the first communications and device 390 for the third communications. This process may be performed any desired number of times or continually. For example, devices 310 and 390 may continue to communicate with one another and share information so that adaptation of the operational parameters used by each of devices 310 and 390 may be made any desired number of times or continually.

Examples of operational parameters may include frequency band assignment (e.g., 5 GHz frequency band, 2.4 GHz frequency band, etc.), channel assignment (e.g., primary, secondary, or other channel and/or including bandwidth of such channels such as 20 MHz, 40 MHz, 80 MHz, etc. channels), scheduling information for coordinating various communications, at least one token for channel access for at least one of the wireless communication device, transmit power for use by for at least one of the wireless communication device, basic services set (BSS) listing of first and second subsets of wireless communication devices associated with the first and second APs, BSS listing of at least one of the wireless communication devices associated with both of the first and second APs, channel statistics of at least one wireless communication channel between the wireless communication devices, timing synchronization function (TSF) information for at least one of the first at least one other wireless communication device, and/or any other operational parameters.

The selection of at least one operational parameter may be made based on different criteria at different times and for different reasons. For example, first at least one operational parameter may be used to minimize interference, second at least one operational parameter may be used to maximize throughput, third at least one operational parameter may be used to increase or maximize robustness, etc.

FIG. 5C is a diagram illustrating another example of communication between wireless communication devices. At or during a first time (time 1B), device 310, which is configured to operate as an AP, supports second communications with device 390, which is also configured to operate as an AP. Device 310 supports first communications with first at least one other device, and device 390 supports third communications with the first at least one other device or second at least one other device. In one implementation, only one of the devices 310 or 390 selects which particular other devices are included within the first and second at least one other device. In another implementation, the devices 310 and 390 operate cooperatively to select which particular other devices are included within the first and second at least one other device. And in even another implementation, device 310 selects which particular other devices are included within the first at least one other device, and device 390 selects which particular other devices are included within the second at least one other device, and the selection made by both devices 310 and 390 is based, at least in part, on information included within and provided via the second communications between devices 310 and 390.

FIG. 5D is a diagram illustrating another example 503 of communication between wireless communication devices for consideration with FIG. 5C. At or during a second time (time 2B), device 310 supports first communications with first, second, or third at least one other device, and device 390 supports third communications with first, second, or third at least one other device. After devices 310 and 390 have supported communications with one another, adaptation or modification of which particular other devices are associated with, serviced by, and in communication with each of devices 310 and 390 may be made. This process may be performed any desired number of times or continually. For example, devices 310 and 390 may continue to communicate with one another and share information so that adaptation of which particular other devices are associated with, serviced by, and in communication with each of devices 310 and 390 may be made any desired number of times or continually.

Note also that operation based on FIG. 5A and FIG. 5B may be performed in cooperation with operation based on FIG. 5C and FIG. 5D. For example, adaptation and modification of both the selection of which particular other devices are associated with, serviced by, and in communication with each of devices 310 and 390 as well as which operational parameters are used for the first and third communications supported by each of devices 310 and 390 may be made.

Various techniques are presented in this disclosure for two or more wireless network managers to coordinate and operate in a synchronized manner with each other. Such wireless network managers are APs in one example. However, note that any type of wireless network managers (e.g., wireless network managers that operates based on at least one proprietary communication protocol, at least one standardized communication protocol, etc.) may be employed in other examples. Also, the two or more wireless network managers need not be operative using the same communication protocol in certain implementations (e.g., IEEE 802.11 for first wireless network manager, another wireless communication protocol such as WiMAX (Worldwide Interoperability for Microwave Access) for second wireless network manager, etc.). Coordination can improve spectrum efficiency within a basic services set (BSS) and minimize interference to other BSSs. In some instances, such techniques can be divided into two areas: inter-AP coordination and time synchronized transmission operation.

1. Inter-AP coordination includes definition of (new) messages to facilitate the exchange of information between APs so as to enable mutually beneficial operation.

2. Time synchronized transmission operation enable STAs within a BSS or between several BSS to concurrently transmit and dynamically minimize interference to each other.

Inter-AP Coordination

APs within a group may be configured to exchange information and negotiate certain semi-static operational parameters to achieve inter-BSS interference coordination (IBIC) that are mutually beneficial to all APs within the group.

Examples of Such

Settings for operating channel, bandwidth (including sub-band for orthogonal frequency division multiple access (OFDMA)), transmit/transmission (TX) power per sub-band, clear channel assessment (CCA) threshold per sub-band. APs may query a centralized or distributed database server, master AP, or controller that is configured to manage the operation of a group of APs. Active negotiation between APs on the setting of operational parameters may be performed and possibly among APs that are managed by the same operator to eliminate the need for a controller.

Load (traffic/user) balancing can also be performed between APs. Since the association procedures are initiated by non-AP STAs, APs may end up with an imbalance of users or offered traffic per AP. An AP may include an indication, or a list of suggested alternatives APs in certain communications (e.g., Beacons and/or Probe Responses) that no more associations may be accepted at a given time. Load balancing allows APs to exchange current load information with each other, with the goal of migrating non-AP STAs to nearby APs and achieve a more balanced load per APs.

Inter-AP Soft Handoff for Outdoor, Low Mobility

Inter-AP soft handoff can be performed for outdoor, low mobility applications. STAs establish multiple associations, but only choose to have one active at any one time and only active AP will receive the packet and be responsible for sending the acknowledgement (ACK). STAs can be configured to use media access control (MAC) of the active AP as the Receiver address (RA) of transmitted PLCP Protocol Data Units (PPDUs). A given STA may change RA at any time, and this is a soft handoff. Active AP may transmit a message indicating the change of active link so that L2 forwarding tables that are used for downlink frames forwarding can be updated.

Shared Associations

For shared associations, STAs can be configured to maintain multiple associations, but all APs will receive the uplink (UL) frame sent by the STA, and APs coordinate among themselves who is responsible for sending the ACK. For downlink (DL) transmissions, APs are synchronized and send the same DL frame to the STA at the same time; STAs combine the rake fingers. Also, STAs use a universally unique MAC address (maybe unicast or multicast) as the RA to represent the group of APs, e.g., a second universally unique MAC that is assigned to an AP such as it is done with multiple basic service set identification (MBSSID). STAs use the basic service set identification (BSSID) of 1 AP as address 3 and use a well-known universally unique value for MAC address in the RA field to represent the group of APs. All APs and STAs that are participating in the group need the addressing information communicated to them. In order for the downlink transmissions sent from separate APs to be combined at the recipient STA, the PHY payload and the scrambler fields of each AP's transmission has to be identical to the PHY payload and the scrambler fields of each of the other AP's transmissions. For example, if null data packet (NDP) ACK is used, then only the signal field (SIG) needs to be identical.

Inter-AP Messaging

Existing management frames and/or new messages may be defined to facilitate the exchange of information between APs. For example, (protected dual of) public action frames may be used between two STAs without an active association. IEEE 802.11 management frames may be encapsulated with another communication protocol such as EtherType or higher layer protocols, and they may be exchanged between APs over a non-wireless means (e.g., via a wired interface such as by using a new EtherType or new protocol that works over Internet protocol (IP)).

Information Exchanged

STA may report certain channel characterization information such as received power of neighboring access points (NAPs) (e.g., measuring Beacons, traffic load per sub-band) may be exchanged between wireless network managers (e.g., APs). Examples of operational parameters of NAPs may include BSS load per sub-band, min/avg/max TX rate, min/avg/max STA interference margin, association count. Interference statistics (CDF) or received power may be identified from an identifiable NAP or all APs. Information related to received (RX) power of any wireless communication devices (e.g., STAs, APs and/or non-AP STAs) may also be exchanged.

AP Exchange

An AP may exchange the following information with at least one other AP either directly, or it may be relayed over-the-air (OTA) by STAs. The exchange of that information may be done in-band on the same frequency or out-ofband on a different frequency. For example, an AP may be configured to use a 5 GHz frequency band for data, and a 2.4 GHz frequency band for exchanging the information below:
1. TSF information
2. BSS Load information
3. HCCA schedules
4. Tokens for channel access Messages to Enable IBIC in the Power and Frequency Domain Downlink (DL)—an AP may be configured to signal to its neighbors of its intention to transmit with lower power in the DL on a set of a sub-band or frequency band (e.g., 5 MHz). The other cells may then be configured to use that information to schedule their BSS edge clients on those sub-bands.

Uplink (UL)—an AP may be configured to signal to its neighbors of its intention to schedule BSS edge users on these set of sub-bands. Other BSSs may want to avoid scheduling their BSS edge users on that part of the spectrum because of the expected high interference.

Interference level—provides information on the interference level experienced in each sub-band. Other APs receiving this message may reduce the interference generated on these sub-bands by either not using them or just reducing the power on them.

The above messages may be implemented as including timestamps for time-synchronized APs.

Time Synchronized Operation

APs may be configured to achieve time synchronization using various means, including based on network time protocol (NTP) clock over the wired network, over the air (OTA) based on TSF received from the master AP. This may be based on the time-of-flight scheme proposed in IEEE 802.11mc to sync up with the absolute clock of the master AP.

Various modes of synchronized operation for all APs in a group are shown below.

Mode 1: Coordinated TDMA for APs. In this mode, tokens that control authorization to transmit are passed between devices. This can be based on AP scheduling, and use of restricted access window (RAW) and periodic restricted access window (PRAW) concepts may be performed such as by using a Resource Allocation frame based on IEEE 802.11ah.

Mode 2: Coordinated simultaneous operation to achieve higher spatial reuse. In this mode, coordinated transmissions may be permitted for either all or a subset of APs in a group (e.g., in a certain time slot, only the first 2 APs in mode 2, while other APs must be quiet). APs may be configured to coordinate to allow for either all UL only or all DL only transmissions at any time slot. TX power can be limited by interference level, either by some form of negotiation between APs, or mandated from controller. In addition, CCA may be disabled. Synchronized Beacons transmissions may be made from APs (e.g., i.e. inter-AP TBTT time for Beacons transmission). Aggregate Beacon information from different BSSID may be included within smaller number of Beacons (e.g., in MBSS). Coordinated rate selection may be performed as well (e.g., in accordance with assigning at least one modulation coding set (MCS)).

Mode 3: Hybrid Fiber-Coaxial (HFC) clear channel assessment (HCCA). In this mode, TX behavior may be explicitly mandated by an AP, and a master schedule may be used to coordinate communications between APs.

Mode 4: Broadcast-only. In this mode, all APs are synchronously transmitting the same data to all STAs.

Mode 5: Carrier sense multiple access/collision avoidance (CSMA/CA) may be performed using an existing mechanism.

APs may be configured to agree on any mode or modes of operation to use immediately or agree on a periodic schedule. The agreement can be made either by direct negotiation between APs (distributed), or via a designated master controller or server. Any combination of the modes above can be scheduled at any point in time (e.g., mode 1 and 2 operating together).

APs may be configured to choose different modes for different sub-bands. For example, an AP may vary the chosen modes or modes on a shorter time-scale (e.g., 1 msec) or longer time-scale (e.g., 10 s of msec's).

APs may be configured to choose different mode(s) of synchronized operation based on SINR experience and offered traffic to different STAs. For example, a STA may be assigned multiple modes by the AP (e.g., multi-user multiple-input-multiple-output (MU-MIMO), carrier sense multiple access/collision avoidance (CSMA/CA)).

Coexistence with Legacy APs and Non-Coordinated High Efficiency Wireless (HEW) APs (e.g., Targeted to IEEE 802.11ax)

Synchronized APs may be configured to broadcast channel reservation messages that indicate that all devices reserve the same window of coordinated transmission time period (CTTP). For example, any messages with network allocation vector (NAV) or long length in SIG to shut down legacy devices. Also, those messages could be request to send/clear to send (RTS/CTS), NAV, CTS-2-self, new management frame with legacy SIG with long DURATION (DUR).

A BSSID (e.g., partial BSSID) may be added to the PHY preamble of newer generation IEEE 802.11 compliant (e.g., IEEE 802.11ax) devices to differentiate transmission within the group and those outside of the group.

In a situation where NAV reservation cannot be achieved, IEEE 802.11ax operative STAs fallback to normal CSMA backoff mechanism, i.e. based on ED and CRS. An AP may be a member of multiple synchronized groups.

Rules for Non-AP STAs

AP may be configured to convey the mode(s) of synchronized operation to non-AP STAs. Non-AP STAs are required to operate within the mode dictated by AP.

AP May Also Be Synchronized in Frequency

A typical required clock accuracy is approximately 20 ppm. Synchronized APs may have a fraction of a PPM frequency offset so that STAs that estimate frequency offset to one associated AP can use the same value for other APs. And in cases where multiple APs transmit a frame directed to a given STA, the STA only needs estimate one frequency offset.

Mode 2: Coordinated Rate Selection

For Downlink

1. APs are time synchronized and aware of CTTP times for the group.

2. Each AP in the group simultaneously sends a downlink sounding frame (e.g., NDP) to enable STAs that it plans to transmit to in the subsequent frame on a given sub-band(s) to estimate downlink SINR. Rate selection frame or NDP frame are either entire frame or long training field (LTF) are orthogonalized, for example by pseudo-noise (PN) sequences.

3. Each intended STA measures the received SINR and responds with the recommended MCS. Each STA feed backs 4 bits of data to signal recommended MCS, and the feedback may be sent at low MCS so that the frame can be decodable with high interference.

4. APs in the group simultaneously transmit their downlink data packets to their intended STAs.

5. Non-AP STAs acknowledge successful data reception to their respective APs.

For Uplink

1. APs are time synchronized and aware of CTTP times for the group.

2. Each AP in the group that plans to schedule a STA for uplink transmission starts by instructing a STA to send an uplink sounding frame (e.g., NDP).

3. Based on the received SINR of the NDP frame, APs provide feedback of the recommended MCS for their STAs either simultaneously after some time, or separately for each STA at a later time.

4. APs in the group instruct their STAs to simultaneously transmit their uplink data packets.

5. APs acknowledge successful data reception to their respective non-AP STAs.

Inter-AP synchronization can enable improved spectrum efficiency by enabling synchronized frame transmissions by multiple APs. Multiple APs may be configured to transmit frames to their respective at least one STA at a coordinated beamforming time period (CBTP) while actively minimizing interference to each other. A group of coordinated APs are those APs that participate in CBTP assignments, and membership of the group can be communicated to all members through management frame exchanges. As described above as well, each AP may be configured to have information regarding the communication channel, covariance matrix, and/or other metrics to the interfered STA as well as to its own STA and use that information to reduce interference to those STA while maximizing gain to its own STA.

In an example of operation, neighboring APs (NAPs) may be synchronized (e.g., using timing synchronization function (TSF)). The NAPs may be configured to exchange information on traffic load for each STA in each BSS, and also using each STA's channel derived beamforming information with respect to its OBSS links. APs and STAs then communicate with one another to learn and/or exchange cross channel information. A master/coordinator device (e.g., an AP) is then configured to compute schedules and to propagate such transmission schedules to the other APs. The NAP then proceeds with beamformed data transmission based on assigned schedules for each AP. Note that an AP can be configured to send a synch frame to tell STAs to send uplink transmission so that AP measures channel from STAs.

Coordinated Beamforming and Nulling

1. All APs may be configured to send synch/trigger frame to their STA or STAs that they plan to transmit to in the subsequent CBTP on a given band, sub-band or multiple sub-bands. Synch frame may be sent at low MCS so that the synch frame can be decodable at high interference. A Synch frame may be sent simultaneously from different APs. This may include any of: overlapping transmissions, MU transmissions, OFDMA transmissions, and include information such that all STAs respond within a fixed time after the synch frame. The Synch frame may be sent in time sharing manner such as slotted time, scheduled time or CSMA protocol. The Synch frame may be implemented to include the time to send an uplink sounding frame. All coordinated APs may specify the same uplink sounding frame transmission time. Uplink sounding frames may be scheduled for sequential transmissions.

2.1. Each STA addressed by an AP synch frame may be configured to respond with uplink sounding frame on sub-band(s) where the triggered frame was received.

Method 1: STAs may respond simultaneously to reduce channel estimation overhead and to allow OBSS channel/covariance matrix to be estimated. Each sounding frame can use different LTF sequences modulated by different PN sequences so that the APs can resolve different uplink channels from different users. APs coordinate such that the responding STA use LTF sequences modulated by different PN sequences (e.g. different columns of the P-matrix used of P_HTLTF matrix (specified in clause 20 of 802.11 standard). For a given LTF, a STA may only transmit on a subset of its assigned tones per antenna (e.g. odds or evens numbered tones). For example, a STA with 2 antennas may split the tones between the 2 antennas, or a STA with 1 antenna may still use a subset of the tones and allow other AP to use the other subset of the tones. Tone assignments may be coordinated between different APs and their responding STAs. Uplink sounding frames may include some or all of the preamble fields, always including the LTFs fields. STAs may respond in a time sharing manner such as slotted time, scheduled time or CSMA protocol with uplink sounding frame. AP schedules the time for which a STA may send the beamforming reports.

Method 2: Each STA can choose to feed back the beamforming report to all APs in the group of coordinated APs that meet certain criteria with respect to that STA (e.g. received power levels within X-dB below the associated AP power level). Each STA reports to its own AP a beamforming report of all channels to all APs as specified above and each AP forwards the information to all coordinated APs. Each STA reports to each AP in the group of coordinated AP a beamforming report. For example, one STA belonging to a center AP may report only the links towards other APs whereas another STA belonging to the center AP report the links towards other.

3. Each AP estimates the channel to its STA(s) and the channel, covariance matrix or other metrics to other simultaneous transmitting STAs from OBSS. Each AP may only need to estimate the above metrics for the sum of the received signals from the OBSS STAs in order to perform beamforming to its own STA and nulling to other OBSS STA.

4. Based on the estimation, each AP determines the beamforming vector(s) that balances OBSS interference and signal power to its intended STA. The number transmitted streams per AP may be limited to allow efficient use of the available degree of freedoms at the AP to reduce interference to OBSS STAs.

5. (Optional step) APs simultaneously transmit a beamformed LTF, and each intended STA measures SINR and then responds with recommended MCS. Each STA feedbacks recommended MCS (e.g., 4 bits). LTF sequences may be modulated by the same PN sequence or tone subsets from Step 2 (Method 1), in order to allow each STA to resolve received interference and choose an appropriate receiver processing.

6. APs simultaneously transmit their beamformed data packets to their intended STA. LTF sequences may be modulated by the same PN sequence or tone subsets from Step 2 (Method 1), in order to allow each STA to resolve received interference and choose an appropriate receiver processing.

Figure 8:
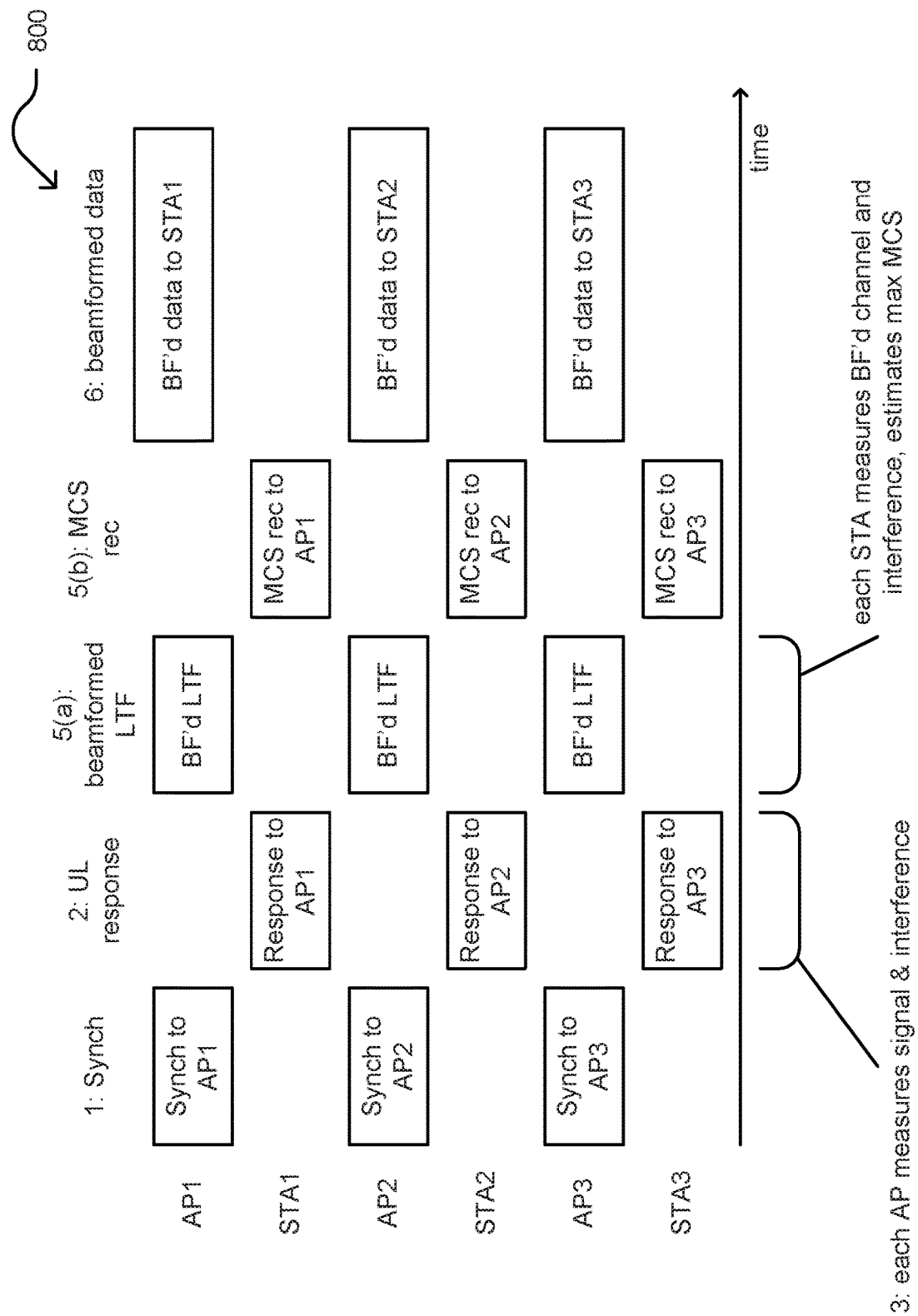
FIG. 8 is a diagram illustrating an example of communications between access points (APs) and wireless stations (STAs).

FIG. 8 is a diagram illustrating an example 800 of communications between access points (APs) and wireless stations (STAs). In this diagram, synchronization transmissions are made from APs to STAs (e.g., AP1 to STA1, etc.), then UL response transmissions are made from STAs to APs (e.g., STA1 to AP1, etc.), then beamformed long training fields (LTFs) transmissions are made from APs to STAs (e.g., AP1 to STA1, etc.), then MCS recommendation UL response transmissions are made from STAs to APs (e.g., STA1 to AP1, etc.), and then DL beamformed data transmissions are made from APs to STAs (e.g., AP1 to STA1, etc.).

Joint DATA Transmission

A STA is associated with one AP, and the STA is configured to measure signals from nearby APs, and then feed back that information to its AP to provide a list of the N-preferred APs for assignments of CBTP, or joint transmission time period (JTTP) time. For example, APs within X-dB received (e.g., some degree lower, by value of X) power of the associated AP may be allowed to participate in JTTP. All APs participating in JTTP would receive a copy of the downlink data for this STA via the wired interface, and APs are instructed the exact time for transmitting this downlink data to their respective STAs. A group of coordinated APs may jointly transmit data to multiple STAs, and typically such APs are BSS edge STAs. In this instance, the same MCS should be used, and the same scrambler value should be used and the same encryption. All APs in the group receive data from all STAs in the group, and all STAs in the group report beamforming feedback to all APs in the group. APs in the group jointly act as a single virtual AP with more antennas, and the APs apply beamforming algorithms as in MU-MIMO in a single AP. The steps described above for uplink sounding and/or feeding back of beamforming report are applicable in this case.

FIG. 6A is a diagram illustrating an embodiment of a method 601 for execution by at least one wireless communication device. The method 601 begins by operating a wireless communication device (WDEV) to support first one or more communications with first one or more other WDEVs (block 610). These first one or more communications may be based on at least one IEEE 802.11 communication protocol. The method 601 continues by operating the WDEV to support second communications with second one or more other WDEVs (block 620). The second one or more other WDEVs are configured to support third communications with at least one of the first one or more other WDEVs and/or one or more other WDEVs. These third one or more communications may be based on the at least one IEEE 802.11 communication protocol and/or one or more other IEEE 802.11 communication protocols.

FIG. 6B is a diagram illustrating another embodiment of a method 602 for execution by at least one wireless communication device. The method 602 begins by performing the steps within blocks 610 and 620 of FIG. 6A (block 611). The method 602 continues by selecting a set of first one or more WDEVs to support first one or more communications based on coordination between the WDEV and the second one or more WDEVs (block 621). The method 602 then operates by selecting at least one operational parameter for use to support the first one or more communications based on coordination between the WDEV and the second at least one wireless communication device (block 631).

FIG. 7A is a diagram illustrating another embodiment of a method 701 for execution by at least one wireless communication device. The method 701 begins by performing the steps within blocks 610 and 620 of FIG. 6A (block 710). The method 701 continues by selecting first set of WDEVs with which to support the first one or more communications based on coordination between the WDEV and the second at least one wireless communication device (block 720). The method 701 then operates by selecting second set of WDEVs with which to support the third one or more communications based on coordination between the WDEV and the second at least one wireless communication device (block 730).

FIG. 7B is a diagram illustrating another embodiment of a method 702 for execution by at least one wireless communication device. The method 701 begins by performing the steps within blocks 610 and 620 of FIG. 6A (block 711). The method 702 continues by selecting first set of at least one operational parameter for use to support the first one or more communications based on coordination between the WDEV and the second at least one wireless communication device (block 721). The method 702 then operates by selecting second set of at least one operational parameter for use to support the third one or more communications based on coordination between the WDEV and the second at least one wireless communication device (block 731).

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one or more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein.

Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication access point (AP) device comprising:
   a communication interface; and
   processing circuitry that is coupled to the communication interface, wherein the processing circuitry is configured to perform peer-to-peer coordination of operations with a second wireless communication AP device having geographically overlapping transmissions by:
   exchanging, via the communication interface with the second wireless communication AP device, beamforming parameters used by each wireless communication AP device to communicate with a corresponding subset of wireless stations (STA) of a plurality of wireless STAs, wherein the wireless communication AP device communicates with a first subset of wireless STAs, and the second wireless communication AP device communicates with a different second subset of wireless STAs, wherein the beamforming parameters exchanged with the second wireless communication AP device comprise orthogonal frequency division multiple access (OFDMA) tone assignments to be used by each wireless communication AP device to communicate with the corresponding subset of wireless STAs; and
   transmitting, on a first channel, one or more data packets to each of the first subset of wireless STAs according to the beamforming parameters used by the wireless communication AP device, simultaneously with the second wireless communication AP device transmitting one or more data packets on the first channel to each of the second subset of wireless STAs according to the beamforming parameters used by the second wireless communication AP device,
   wherein the first subset of wireless STAs and the second subset of wireless STAs include at least one common STA, wherein the at least one common STA receives and combines the one or more data packets transmitted from the wireless communication AP device and the one or more data packets transmitted from the second wireless communication AP device.

2. The wireless communication AP device of claim 1, wherein the beamforming parameters exchanged with the second wireless communication AP device comprise modulation & coding set/rates (MCS) to be used by each wireless communication AP device to communicate with the corresponding subset of wireless STAs.

3. The wireless communication AP device of claim 1, wherein the beamforming parameters exchanged with the second wireless communication AP device comprise channel estimation information.

4. The wireless communication AP device of claim 1, wherein the beamforming parameters are based on at least one of:
   frequency band assignments for each wireless communication AP device;
   channel assignments for each wireless communication AP device;
   scheduling information for exchange of the beamforming parameters;
   at least one token for channel access for each wireless communication AP device;
   transmit power for use by each wireless communication AP device or one or more wireless STAs;
   basic services set (BSS) listing of communications by each wireless communication AP device;
   channel statistics of at least one wireless communication channel used by each wireless communication AP device or
   timing synchronization function (TSF) information for each wireless communication AP device.

5. The wireless communication device of claim 1, wherein the communication interface used to exchange beamforming parameters comprises a wired communication interface; and further comprising a wireless communication interface used to transmit the one or more data packets to the first subset of wireless STAs.

6. The wireless communication AP device of claim 1, wherein the processing circuitry is further configured to exchange, via the communication interface with the second wireless communication AP device, an identification of a number of wireless STAs within each corresponding subset of wireless STAs.

7. The wireless communication AP device of claim 1, wherein the beamforming parameters comprise a covariance matrix for each wireless STA of the plurality of wireless STAs.

8. The wireless communication AP device of claim 7, wherein the processing circuitry is further configured to provide a covariance matrix for each wireless STA of the first subset of wireless STAs to the second wireless communication AP device, and receive a covariance matrix for each wireless STA of the second set of wireless STAs from the second wireless communication AP device; and
   wherein each wireless communication AP device uses the covariance matrix for each wireless STA received from the other wireless communication AP device to determine beamforming parameters used by said wireless communication AP device to communicate with the corresponding subset of wireless STAs.

9. A method for execution by a wireless communication AP device, the method comprising:
   exchanging, via a communication interface with a second wireless communication AP device, beamforming parameters used by each wireless communication AP device to communicate with a corresponding subset of wireless stations (STA) of a plurality of wireless STAs, wherein the wireless communication AP device communicates with a first subset of wireless STAs, and the second wireless communication AP device communicates with a different second subset of wireless STAs, wherein the beamforming parameters exchanged with the second wireless communication AP device comprise orthogonal frequency division multiple access (OFDMA) tone assignments to be used by each wireless communication AP device to communicate with the corresponding subset of wireless STAs; and
   transmitting, on a first channel, one or more data packets to each of the first subset of wireless STAs according to the beamforming parameters used by the wireless communication AP device, simultaneously with the second wireless communication AP device transmitting one or more data packets on the first channel to each of the second subset of wireless STAs according to the beamforming parameters used by the second wireless communication AP device, wherein the first subset of wireless STAs and the second subset of wireless STAs include at least one common STA, wherein the at least one common STA receives and combines the one or more data packets transmitted from the wireless communication AP device and the one or more data packets transmitted from the second wireless communication AP device.

10. The method of claim 9, wherein the beamforming parameters exchanged with the second wireless communication AP device comprise modulation & coding set/rates (MCS) to be used by each wireless communication device to communicate with the corresponding subset of wireless STAs.

11. The method of claim 9, wherein the beamforming parameters exchanged with the second wireless communication AP device comprise channel estimation information.

12. The method of claim 9, wherein the communication interface used to exchange beamforming parameters comprises a wired communication interface, and wherein the method further comprises transmitting, via a wireless communication interface, the one or more data packets to the first subset of wireless STAs.

13. The method of claim 9, further comprising exchanging, via the communication interface with the second wireless communication AP device, an identification of a number of wireless STAs within each corresponding subset of wireless STAs.

14. The method of claim 9, wherein the beamforming parameters comprise a covariance matrix for each wireless STA of the plurality of wireless STAs.

15. The method of claim 14, further comprising providing a covariance matrix for each wireless STA of the first subset of wireless STAs to the second wireless communication AP device, and receiving a covariance matrix for each wireless STA of the second set of wireless STAs from the second wireless communication AP device; and wherein each wireless communication AP device uses the covariance matrix for each wireless STA received from the other wireless communication AP device to determine beamforming parameters used by said wireless communication AP device to communicate with the corresponding subset of wireless STAs.

* * * * *